US010195966B2

(12) United States Patent
Ueguri et al.

(10) Patent No.: US 10,195,966 B2
(45) Date of Patent: Feb. 5, 2019

(54) SEAT CORE MEMBER, SEAT PORTION, AND SEAT

(71) Applicant: JSP Corporation, Tokyo (JP)

(72) Inventors: Motoaki Ueguri, Kanuma (JP); Atsuo Takayama, Kanuma (JP); Keiichi Hashimoto, Kanuma (JP)

(73) Assignee: JSP Corporation, Tokyo (JP)

( * ) Notice: Subject to any disclaimer, the term of this patent is extended or adjusted under 35 U.S.C. 154(b) by 0 days.

(21) Appl. No.: 15/558,498

(22) PCT Filed: Mar. 4, 2016

(86) PCT No.: PCT/JP2016/056823
§ 371 (c)(1),
(2) Date: Sep. 14, 2017

(87) PCT Pub. No.: WO2016/147913
PCT Pub. Date: Sep. 22, 2016

(65) Prior Publication Data
US 2018/0079328 A1 Mar. 22, 2018

(30) Foreign Application Priority Data
Mar. 18, 2015 (JP) .................. 2015-054432

(51) Int. Cl.
*B60N 2/64* (2006.01)
*A47C 7/18* (2006.01)
(Continued)

(52) U.S. Cl.
CPC ............. *B60N 2/24* (2013.01); *A47C 7/18* (2013.01); *A47C 7/185* (2013.01); *B29C 33/42* (2013.01);
(Continued)

(58) Field of Classification Search
CPC .... B60N 2/995; B60N 2/7035; B60N 2/5891; B60N 2/5816; B60N 2/646; A47C 7/185; B29C 33/42
See application file for complete search history.

(56) References Cited

U.S. PATENT DOCUMENTS 3,161,436 A * 12/1964 Hood .................. A47C 27/146
264/229
3,612,607 A * 10/1971 Lohr ....................... A47C 7/18
297/451.11
(Continued)

FOREIGN PATENT DOCUMENTS

JP S63-068839 U 5/1988
JP S63-091051 U 6/1988
(Continued)

OTHER PUBLICATIONS

Translation of Written Opinion issued in PCT/JP2016/056823; dated May 31, 2016.
(Continued)

*Primary Examiner* — Timothy J Brindley
(74) *Attorney, Agent, or Firm* — Studebaker & Brackett PC

(57) ABSTRACT

A seat core member of a seat portion provided with the seat core member made of a hard synthetic resin foam and a cushion layer made of a soft synthetic resin foam and covering the seat core member is provided, and the seat core member includes a plurality of ridges extending in a rising direction of the seat core member in a rising portion of the seat core member being in contact with the cushion layer and opposing to calves of a body is formed.

9 Claims, 4 Drawing Sheets

(51) Int. Cl.
  *B29C 33/42* (2006.01)
  *B60N 2/24* (2006.01)
  *B60N 2/90* (2018.01)
  *B60N 2/68* (2006.01)

(52) U.S. Cl.
  CPC .............. *B60N 2/64* (2013.01); *B60N 2/68* (2013.01); *B60N 2/90* (2018.02); *B60N 2/995* (2018.02)

(56) References Cited

U.S. PATENT DOCUMENTS

| | | | | |
|---|---|---|---|---|
| 3,712,673 A | * | 1/1973 | Swenson | A47C 7/18 297/214 |
| 3,833,260 A | * | 9/1974 | Harder, Jr. | A47C 7/18 264/46.4 |
| 4,837,881 A | | 6/1989 | Kondo et al. | |
| 4,860,415 A | * | 8/1989 | Witzke | B29C 44/1271 29/91.1 |
| 4,989,284 A | * | 2/1991 | Gamm | A47C 7/021 5/652.1 |
| 5,762,842 A | | 6/1998 | Burchi et al. | |
| 5,827,546 A | | 10/1998 | Burchi et al. | |
| 5,827,547 A | | 10/1998 | Burchi et al. | |
| 5,882,073 A | | 3/1999 | Burchi et al. | |
| 8,821,777 B2 | * | 9/2014 | San Miguel | A47C 7/18 264/225 |
| 2004/0084937 A1 | * | 5/2004 | Berta | A47C 7/18 297/180.14 |
| 2004/0265561 A1 | | 12/2004 | Bruning | |
| 2005/0140199 A1 | * | 6/2005 | Kang | B60N 2/4263 297/452.27 |
| 2007/0085383 A1 | | 4/2007 | Bruning | |
| 2010/0102615 A1 | * | 4/2010 | Yamauchi | B60N 2/7029 297/452.6 |
| 2010/0194171 A1 | * | 8/2010 | Hirata | B60N 2/01508 297/452.48 |
| 2013/0157014 A1 | | 6/2013 | Mori et al. | |
| 2014/0077550 A1 | * | 3/2014 | Makiguchi | B60N 2/02 297/284.11 |
| 2015/0028650 A1 | | 1/2015 | Rossi et al. | |
| 2018/0014650 A1 | * | 1/2018 | Nakao | B29C 44/00 |

FOREIGN PATENT DOCUMENTS

| | | |
|---|---|---|
| JP | 2000-517209 A | 12/2000 |
| JP | 2003-529484 A | 10/2003 |
| JP | 2011-110089 A | 6/2011 |
| JP | 2012-051176 A | 3/2012 |

OTHER PUBLICATIONS

International Search Report issued in PCT/JP2016/056823; dated May 31, 2016.

Written Opinion issued in PCT/JP2016/056823; dated May 31, 2016.

The extended European search report issued by the European Patent Office dated Oct. 17, 2018, which corresponds to European Patent Application No. 16764743.7-1010 and is related to U.S. Appl. No. 15/558,498.

* cited by examiner

MESH EMBOSSMENT

STRIPE PATTERN

RHOMBUS EMBOSSMENT

DOT EMBOSSMENT

SEAT CORE MEMBER, SEAT PORTION, AND SEAT

TECHNICAL FIELD

The present invention relates to a technique for reducing noise generated in an automobile, and more particularly to a technique for reducing noise generated from a seat.

BACKGROUND ART

In recent years, the development of automobile technology has made engine sound and the like reduced. As a result, small noise in the car has caused to be anxious. Although there are multiple noise generation sources, the present invention is to reduce a noise generated by rubbing plastic materials constituting a seat portion of a seat with each other.

Generally, a seat for an automobile (hereinafter, referred to as a seat) includes a backrest portion with which a back of a driver's body is in contact to support the body from behind, and a seat portion with which a hip and a thigh are in contact to support the body from below. It is known that the seat portion includes a seat core member formed of a relatively hard material for maintaining the shape of the seat portion, and a cushion layer covering the seat core member and formed of a relatively soft material functioning as a cushioning member between the body and the seat core member.

A technique for forming a seat by using a soft urethane-based resin foam as a cushion layer and a thermoplastic resin foam such as a hard urethane-base resin foam or a polystyrene-base resin foam as a seat core member, and covering the seat core member with the cushion layer is known as a seat structure for the automobile.

This technique is disclosed in, for example, Patent Documents 1 and 2.

In Patent Document 1, a structure and a material of a seat cushion member 1 are proposed in which a soft polyurethane foam layer 2 covers a core member 3 made of a polyolefin resin foam. The seat illustrated in the document is a seat integrally formed with a backrest portion substantially perpendicular to a horizontal seat portion of the seat, and includes a cushion layer for imparting a seating comfort when a passenger sits on, and a seat core member which is under the cushion layer and responsible for structural strength and rigidity required for the seat.

In Patent Document 2, a problem is pointed out as "in a case of a horizontal seat, if a body of a passenger is not properly fixed with the seat belt, when a pelvis of the passenger sitting moves forward and downward by a collision, there is a possibility that the seat belt is entangled with the body of the passenger to be a fatal accident". In order to prevent this, "an anti-submarine seat having a structure in which a relatively hard polyurethane foam is covered by a relatively soft polyurethane foam, and a structure that prevents the passenger from slipping off the seat in the event of an accident by making a seat surface rise forward or hardening a front end" is proposed.

On the other hand, in the structures as described above, there are techniques disclosed in the following Patent Documents 3 and 4 with respect to noise countermeasures generated by rubbing of other members with each other.

Patent Document 3 describes a current situation that "in an interior material made of a foam mold body of an automobile, the interior material having a flat surface is used in consideration of ease of cleaning and the like" and a problem that "during running of the vehicle or the like, a vehicle structure and the interior material, for example, a tool box mounted on the vehicle, in contact therewith rub against each other due to vibration or the like, which may cause abnormal noise". As a solution to the problem, "a foam mold body molded by heating expandable resin particles filled in a foam molding mold, provided with a plurality of first ridges aligned in one direction and a plurality of second ridges aligned in the other direction and arranged to intersect with the first ridges on the surface, and in which the cross sections of the first ridge and the second ridge each is tapered to a tip end side" is proposed.

In addition, Patent Document 4 describes problems that: "relating to the automobile, reducing noise has become a problem for many years. Specifically, reduction of squeaking noise is a problem. Focusing on noise caused by a plastic foam product, squeaking noise is caused by friction between the plastic foam product and another automobile component. The cause of the friction is periodic shaking, vibration, bending or twisting of the automobile". As a solution to the problems, "a plastic foam product that is formed from beads and is provided with spherical, conical protrusions formed so as to minimize noise due to the friction on the surface of the beads" is proposed.

CITATION LIST

Patent Documents

Patent Document 1: JP-UM-A-63-68839
Patent Document 2: JP-T-2000-517209
Patent Document 3: JP-A-2012-51176
Patent Document 4: JP-T-2003-529484

SUMMARY OF THE INVENTION

Problems to be Solved by the Invention

For example, when sitting on a seat illustrated in Patent Document 1, a load from above is applied to a "horizontal portion" of a seat core member and a cushion layer, opposed to a hip and a thigh of a body, and the cushion layer is recessed in the load direction. In a case where the cushion layer and the seat core member do not adhere to each other, due to the deformation, the cushion layer moves in a downward direction of a "rising portion" of the seat core member of the seat portion, opposed to calves of the body. At this time, a rubbing sound may be generated on a contact surface between the seat core member and the cushion layer. In addition, even when standing up from the seat, as the cushion layer moves upward from the rising portion as the horizontal portion returns from a recessed state, a rubbing sound may be generated on the contact surface between the seat core member and the cushion layer.

As described above, rubbing sound may be generated due to relative movement between the seat core member of the rising portion and the cushion layer, when sitting on, when leaving the seat, or when the seat portion is deformed so that the seat absorbs vibration of the automobile, or the like.

Generally, it is known that the rubbing sound as described above is generated by a stick-slip phenomenon which occurs when the difference between a dynamic friction coefficient and a static friction coefficient of each of the foams is large on the contact surface between the foams. In order to reduce the occurrence of such rubbing sound, by assigning a latticed ridge or a fine uneven (embossed) shape tapering toward the tip end side on the surface of the foam, foams having a reduced contact area with other material are proposed in Patent Documents 3 and 4 as described above.

However, according to the technique proposed in Patent Document 3, in a case of a seat portion where sliding occurs in a rising direction of the seat core member on the contact surface between the cushion layer and the seat core member, in the latticed ridge, the existence of the ridge intersecting with the sliding movement of the seat core member in the rising direction becomes resistance and the ridge vibrates, so that it is difficult to reduce the rubbing sound. In addition, the foam proposed in Patent Document 4 is effective against sliding with a material such as an iron plate having a small friction coefficient. However, the foam is not effective for sliding with a material such as urethane resin foam having a large friction coefficient, and by applying a force to each fine unevenness on the surface of the foam, the uneven shape itself vibrates, and thus the stick-slip phenomenon occurs and it is difficult to effectively reduce the rubbing sound.

The present invention has been made in view of the problems of the above-described related art of the seat portion provided with the seat core member made of a hard synthetic resin foam and the cushion layer made of a soft synthetic resin foam covering the seat core member. A first object thereof is to provide a seat core member in which occurrence of rubbing sound due to sliding on a contact surface between a cushion layer and the seat core member is suppressed, and a second object is to provide a seat portion using the seat core member and a seat using the seat portion.

Means for Solving the Problems

According to the present invention, in order to solve the above problems, a seat core member, a seat portion, and a seat described in the following (1) to (7) are provided.
(1) A seat core member including:
   a plurality of ridges that extend in a rising direction of the seat core member in a rising portion of the seat core member being in contact with a cushion layer and opposing to calves of a body, in the seat core member of a seat portion provided with the seat core member including a hard synthetic resin foam and the cushion layer including a soft synthetic resin foam and covering the seat core member.
(2) The seat core member according to (1) above,
   in which the ridges are respectively formed in parallel, and a length of each of the ridges in the rising direction of the seat core member is at least ten times or more a width of the ridge.
(3) The seat core member according to (1) or (2) above,
   in which each of the ridges extends in the rising direction of the seat core member as a continuous ridge.
(4) The seat core member according to any one of (1) to (3) above,
   in which the ridges have a height of 0.1 to 3 mm, a width of 0.1 to 1 mm, a groove width of 0.5 to 4 mm, and a ridge pitch of 1 to 5 mm.
(5) The seat core member according to any one of (1) to (4) above,
   in which the hard synthetic resin foam that forms the seat core member is a polypropylene-based resin foam.
(6) The seat core member according to any one of (1) to (5) above,
   in which the soft synthetic resin foam that forms the cushion layer is a polyurethane-based resin foam.
(7) A seat portion including:
   a seat core member according to any one of (1) to (6) above; and
   a cushion layer including a soft synthetic resin foam and covering the seat core member.
(8) A seat including:
   a seat portion according to (7) above; and
   a backrest portion.

Advantageous Effects of Invention

According to the present invention, by providing a plurality of ridges extending in the rising direction of the seat core member in the rising portion of the seat core member opposed to the calves of the body, when a passenger sits on the seat portion, or when the cushion layer deforms by exerting the cushioning effect, vertical sliding of the seat core member and the cushion layer in the rising portion of the seat portion is promoted, and the occurrence of rubbing sound caused by the sliding of the contact surface can be effectively reduced without impairing the cushioning property of the cushion layer.

In addition, vertical sliding of the seat core member and the cushion layer in the rising portion of the seat portion is promoted, so that the cushion layer can be prevented from twisting or lateral shift.

EMBODIMENTS FOR CARRYING OUT THE INVENTION

Hereinafter, an embodiment of a seat core member, a seat portion, and a seat according to the present invention will be described in detail with reference to the drawings. The seat core member may include a member for fixing a seat to a vehicle body, a member for fixing a cover, and the like, but it does not relate to the essence of the present invention, so that explanation thereon is omitted in this specification. In addition, the cover means a member that covers the top surface or the entire surface of a seat portion according to design choice.

Figure 1:
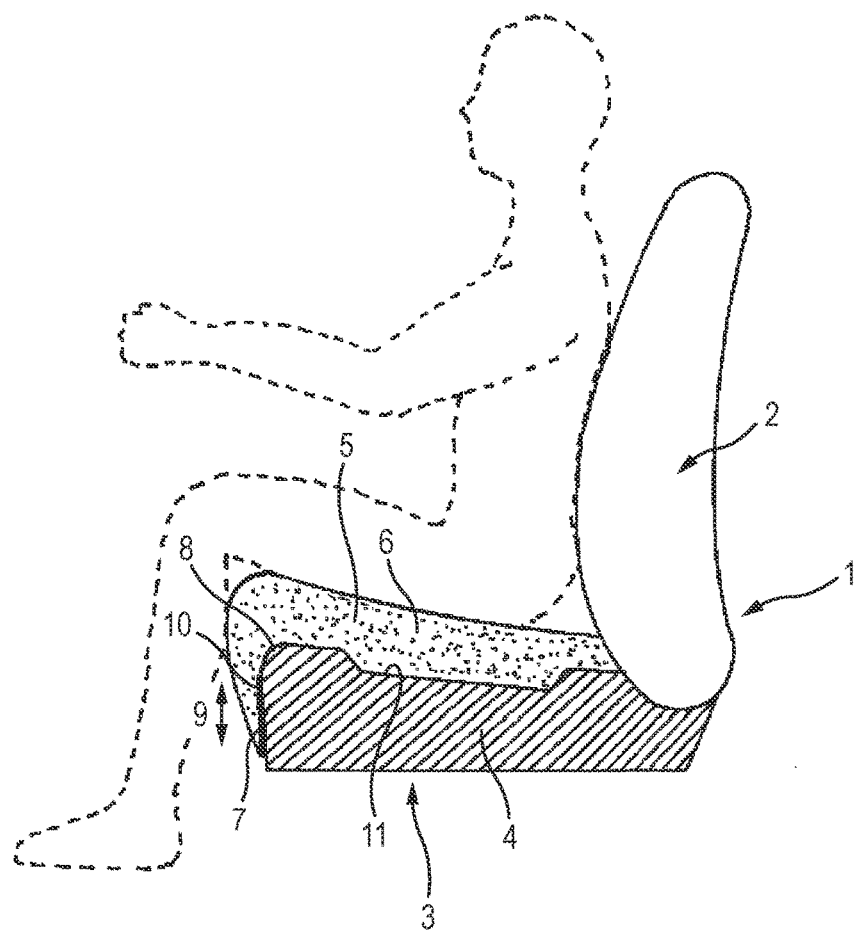
FIG. 1 is a side cross-sectional view conceptually illustrating an entire seat formed using an embodiment of a seat core member according to the present invention.

FIG. 1 is a conceptual side cross-sectional view of a seat formed using a seat core member according to the present invention. A seat 1 illustrated in FIG. 1 is a type in which a backrest portion 2 and a seat portion 3 are separated. Hereinafter, the separated type of seat will be described, but the present invention can be applied to a type of seat in which the backrest portion 2 and the seat portion 3 are not separated.

The seat portion 3 includes a seat core member 4 formed of a hard material in order to maintain a shape of the seat portion 3 and fixed to a vehicle body (not illustrated), and a cushion layer 5 formed of a material of a relatively soft material functioning as a cushioning material between the body and the seat core member 4, and a top surface thereof is further covered with a cover (not illustrated), if necessary.

When the passenger sits on a horizontal portion 6 located at an upper portion of the seat portion 3 of the seat 1 illustrated in FIG. 1, a rising portion 7 of the seat core member 4 in a front direction of the vehicle body faces the passenger's calves via the cushion layer 5. When a person sits on or leaves the seat portion 3 or when the cushion layer 5 elastically deforms so as to exert a cushioning effect, the horizontal portion 6 sinks in a vertical direction and returns. In a case where the cushion layer 5 and the seat core member 4 do not adhere to each other, the cushion layer 5 relatively moves in the vertical direction with respect to a corner portion 8 of the seat core member in accordance with this deformation. Due to this movement, in the rising portion 7, sliding occurs on the contact surface between the cushion layer 5 and the seat core member 4, so that rubbing sound may be generated.

A hard synthetic resin foam is used for the above seat core member 4 in the present invention. This is because the shape of the seat core member 4 can be maintained and reduce the weight. Examples of the hard synthetic resin foam include a polypropylene-based resin foam, a polyethylene-based resin foam, a polystyrene-based resin foam, and the like, and any of these may be used. Among these, the polypropylene-based resin foam is preferable because the polypropylene-based resin foam is excellent in heat resistance and mechanical strength, particularly compression set properties.

In a case where a polypropylene-based resin foam is used for the seat core member 4, the apparent density is preferably 0.01 to 0.5 g/cm$^3$, more preferably 0.015 to 0.4 g/cm$^3$, and particularly preferably from 0.02 to 0.3 g/cm$^3$. The apparent density of the polypropylene-based resin foam is set to be within the above range, so that it is possible to provide the seat core member which is excellent in rigidity and shape retaining property and unlikely to sag for long-term use. Although the polypropylene-based resin foam may be either a foamed particle molded article or extruded form, since the foamed particle molded article has a dense and smooth skin layer on the entire surface thereof, it is preferable because waste is less generated and strength can be improved so that chipping and cracking are unlikely to occur.

For the material of the cushion layer 5, a polyurethane-based resin foam which is generally used for a cushion pad is preferable. The apparent density thereof is preferably 0.01 to 0.1 g/cm$^3$, and more preferably 0.02 to 0.08 g/cm$^3$. By forming the cushion layer 5 from the polyurethane-based resin foam having such an apparent density, it is possible to constitute a seat that imparts a resilient and comfortable seating feeling.

Figure 2:
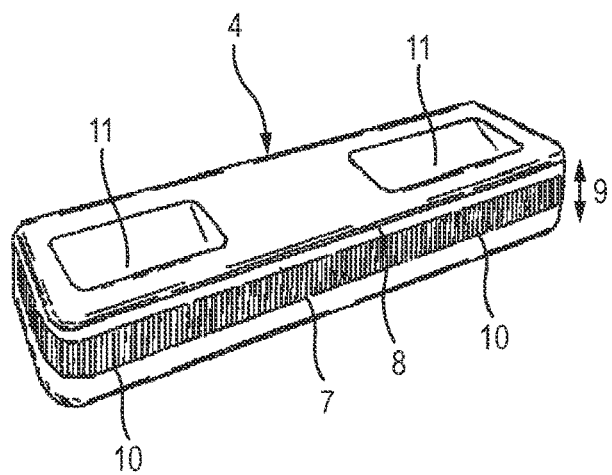
FIG. 2 is a conceptual perspective view illustrating an embodiment of a seat core member according to the present invention.
Figure 3:
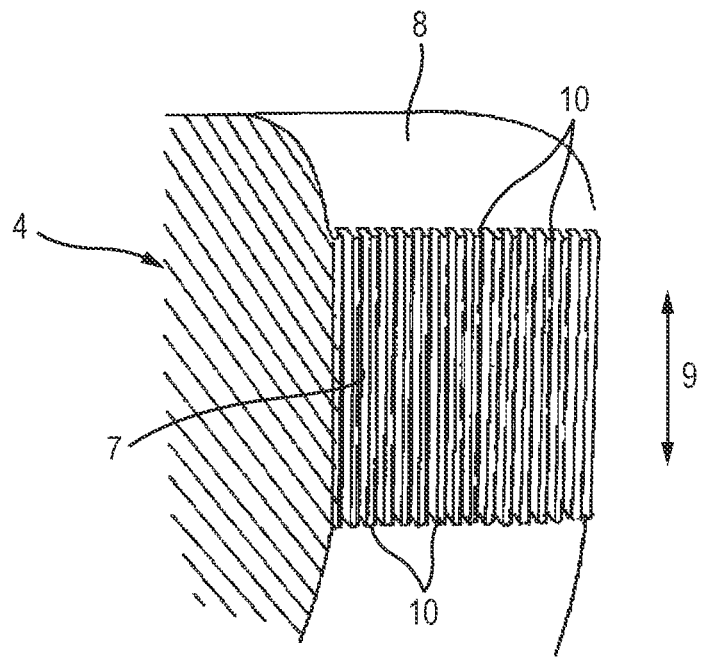
FIG. 3 is a conceptual partially enlarged perspective view illustrating an embodiment of a rising portion of a seat core member according to the present invention.

FIG. 2 is a conceptual perspective view of the seat core member 4 according to the present invention described above. FIG. 3 is a conceptual partially enlarged perspective view of the rising portion 7 of the seat core member 4.

As illustrated in FIGS. 2 and 3, the seat core member 4 is provided with a plurality of ridges 10 in a rising direction 9 on the rising portion 7 of a peripheral surface thereof. In addition, as illustrated in FIG. 2, in order to have an anti-submarine structure, a recessed portion 11 descending rearward (that is, rising forward) is formed in a portion of the seat core member 4 where the hip of the body abuts.

Generally, it is considered that the rubbing sound caused by the sliding movement of the seat core member and the cushion layer as described above occurs due to the occurrence of the stick-slip phenomenon due to the relative movement of the seat core member and the cushion layer. Specifically, when two objects such as the seat core member and the cushion layer relatively move, the two objects are elastically deformed in a state where the contact surfaces of the two objects are fixed due to the frictional force. When the restoring force of two objects due to the deformation exceeds the frictional force, the two objects restore the original shape. The vibration phenomenon caused by repeating these is the stick-slip phenomenon. It is considered that the rubbing sound is generated by such vibration. It is considered that the stick-slip phenomenon is a cause of abnormal noise such as "chattering sound" in polishing, or the like.

In a case of the present invention, as can be seen from FIGS. 2 and 3, in the rising portion 7 of the seat core member 4 being in contact with the cushion layer 5, the plurality of ridges 10 extending in the rising direction 9 of the seat core member 4 are disposed, so that the effect of reducing a rubbing sound is obtained. Although the mechanism by which the effect can be obtained is not certain, it can be considered as follows.

In the present invention, the extension direction of the ridges 10 is the rising direction 9 of the seat core member 4. In addition, the direction of the relative movement of the cushion layer 5 and the seat core member 4, which occurs when a person is seated, or the like, is the rising direction 9 of the seat core member 4. Therefore, the extension direction of the ridge 10 and the direction of the relative movement of the cushion layer 5 and the seat core member 4 coincide with each other. The portion where the cushion layer 5 and the seat core member 4 are in contact with each other is the tip end of the ridge 10, which is a linear region extending in the rising direction 9 of the seat core member 4, so that sliding between the cushion layer 5 and the seat core member 4 in the rising direction 9 is promoted. As a result, even if the cushion layer 5 and the seat core member 4 move relatively in the rising direction 9, it is considered that the ridge 10 is unlikely to be elastically deformed and the stick-slip phenomenon hardly occurs so that the rubbing sound is reduced.

In addition, as described above, it is considered that the sliding of the cushion layer 5 and the seat core member 4 in the rising direction 9 is promoted, so that it is possible to prevent twisting of the cushion layer 5 and lateral shift in the vehicle width direction.

Figure 4:
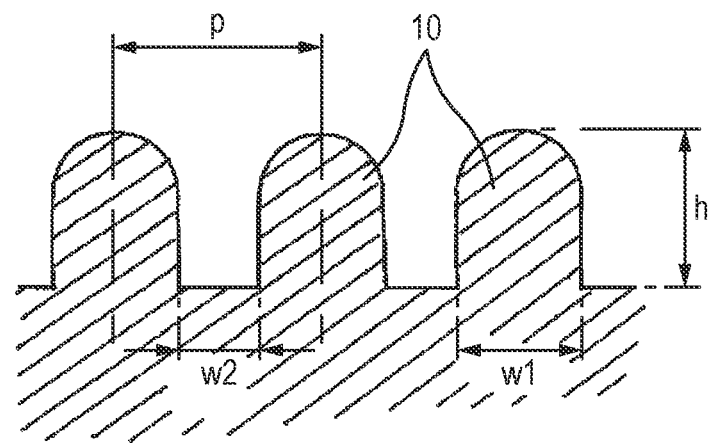
FIG. 4 is a conceptual cross-sectional view illustrating an embodiment of ridges provided in a seat core member according to the present invention.

FIG. 4 is a conceptual cross-sectional view of the ridge 10. Each of the ridges 10 has a tip end having a semicircular arc shape in cross-section, and a plurality of the ridges 10 are formed in parallel in the rising portion 7 at the same interval. The tip end of the ridge 10 is not limited to a semicircular arc shape, and the cross-section of the ridge may be a triangle, a rectangle, a trapezoid, a semicircle with a truncated tip end, or the like. From the viewpoint of sufficient strength at the base portion and reducing the contact area with the cushion layer 5, it is preferable that the tip end of the ridge 10 is formed to be tapered. In addition, as illustrated in FIG. 3, the ridge 10 may be formed as a single continuous ridge on the rising portion 7 of the seat core member 4, but the ridge 10 may be formed in an intermittent ridge which is a ridge disconnected in the middle. Even in a case where the ridge 10 is formed as the intermittent ridge, it is necessary that the length of the ridge in the rising direction of the seat core member is sufficiently longer than the width of the ridge. The length of each of the ridges in the rising direction of the seat core member is preferably at least 10 times the width of the ridge, and more preferably 20 times or more.

As a specific dimension of the ridge 10, it is preferable that the height h of the ridge is 0.1 to 3 mm, the width w1 of the ridge is 0.1 to 1 mm, the groove width w2 is 0.5 to 4 mm, and the ridge pitch p is 1 to 5 mm, and it is more preferable that the height h of the ridges is 0.2 to mm, the width w1 of the ridges is 0.2 mm to 1 mm, the groove width w2 is 0.5 to 2 mm, and the ridge pitch p is 1 to 3 mm. The dimensions of the ridge are set to be in the above range, so that the strength of the ridge is maintained, vibration of the ridge itself is less likely to occur, the contact area with the cushion layer 5 is reduced, and generation of rubbing sound can be effectively suppressed.

Regarding the portion where the ridge 10 is provided, it is indispensable to provide the ridge 10 in the rising portion 7 of the seat core member 4, but it is preferable that the ridge is appropriately provided toward the sliding direction in a portion which comes in contact with the cushion layer 5 and there is a possibility of occurrence of rubbing sound due to sliding between the seat core member 4 and the cushion layer 5.

EXAMPLES

Figure 5:
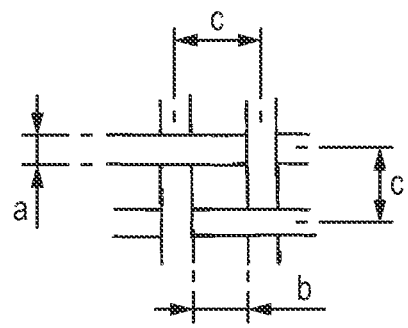
FIG. 5 is an enlarged view of embossments of various uneven shapes (molds) evaluated rubbing sounds.
Figure 5:
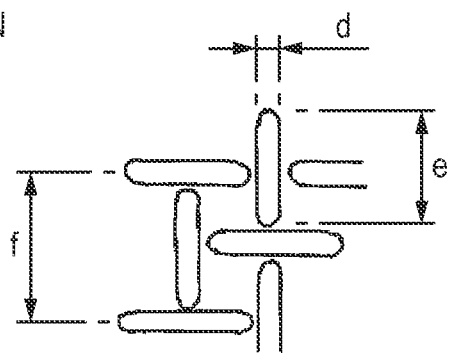
Figure 5:
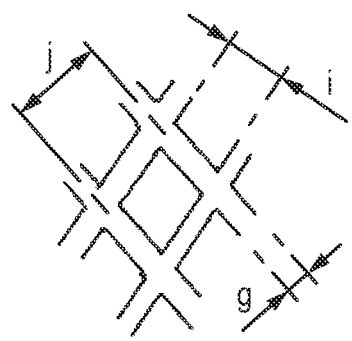
Figure 5:
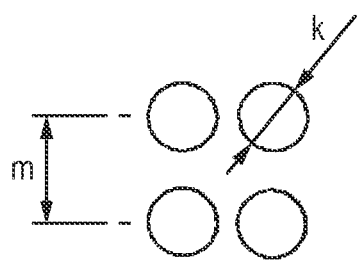

Polypropylene-based resin foamed particles (manufactured by JSP Corporation, EPP-block, expansion ratio: 30 times) were filled in a mold having a length of 500 mm, a width of 300 mm, and a thickness of 60 mm and subjected to in-mold molding by steam heating. A portion of the surface of the mold has a detachable structure and by exchange of adapter provided various uneven shapes on the surface, the surface of the foam was shaped into embossments of various uneven patterns illustrated in FIGS. 5 and 6.

The embossment of the uneven pattern on the surface of the foamed body had approximately the following dimensions. For dimensions of the uneven pattern, each dimension of the uneven shape of the mold was arbitrarily measured at 30 points, and the arithmetic average value of the measured values was used.

Mesh embossment: protrusion height is 0.4 mm, groove width (a) is 0.8 mm, protrusion width (b) is 1 mm, and groove pitch (c) is 2 mm Stripe pattern: protrusion height is 0.4 mm, groove width (d) is 0.8 mm, longitudinal length of groove (e) is 3 mm, and groove pitch (f) is 4 mm Rhombus embossment: protrusion height is 0.4 mm, groove width is 0.8 mm, protrusion width (i) is 1.2 mm, and ridge pitch (j) is 2 mm Dot embossment: dot height is 0.2 mm, dot diameter (k) is 1.2 mm, and dot pitch is 2 mm Dot embossment (high): dot height is 0.4 mm, dot diameter (k) is 1.2 mm, and dot pitch (m) is 2 mm Vertical embossment (present invention): ridge height (h) is 0.4 mm, ridge width (w1) is 0.4 mm, groove width (w2) is 1.0 mm, and ridge pitch (p) is 1.4 mm The molded product was dried in an oven at 60° C. for 12 hours or more, and after moisture was removed sufficiently, the molded product was used for rubbing sound evaluation test. The urethane cushion was obtained by purchasing a commercially available vehicle seat and cutting the pad portion (density: 0.045 g/cm$^3$) to 100 mm×100 mm×50 mm. A skin surface was left on at least one surface of the 100 mm×100 mm surface.

Figure 6:
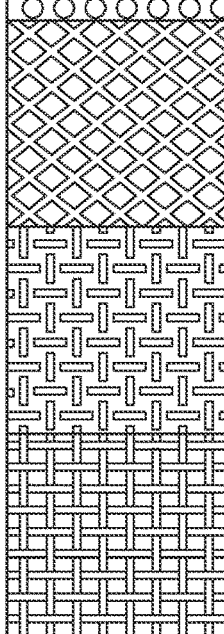
FIG. 6 is a diagram illustrating embossments and evaluation results of various uneven shapes (molds) evaluated the rubbing sound.

The urethane cushion (skin surface side) cut into 100 mm×100 mm×50 mm was pressed against the above-described foam test piece with a load of 392 N, and moved against the surface of the foamed body with embossment by various molds of uneven pattern illustrated in FIG. 6 at a speed of 200 mm/sec in a direction corresponding to the vertical direction (vertical direction of rising portion) in FIG. 6. The rubbing sounds generated at that time were respectively evaluated.

Evaluation of "no embossment" was evaluated as "XX", although the occurrence of rubbing sound was reduced more than "no embossment", a case where the rubbing sound still occurred was evaluated as "X", and a case where the occurrence of rubbing sound was effectively suppressed was evaluated as "O". As illustrated in FIG. 6, the evaluation result of the "dot embossment (high)" was "XX" of the same evaluation as "no embossment". The evaluation results of the "mesh embossment", "stripe pattern", "rhombus embossment", and "dot embossment" were "X". The evaluation result of the "vertical embossment" corresponding to the present invention was "O".

That is, the effect of reducing the rubbing sound was observed most in a case provided with the ridge of the seat core member according to the present invention.

The above description merely illustrates a specific preferred embodiment for the purpose of explanation and illustration of the present invention. Therefore, the present invention is not limited to the above-described embodiment, and includes many further changes and modifications within the scope not deviating from the essence thereof.

This application is based on Japanese Patent Application (Japanese Patent Application No. 2015-54432) filed on Mar. 18, 2015, the entirety of which is incorporated by reference. In addition, all references cited herein are incorporated in their entirety.

INDUSTRIAL APPLICABILITY

According to the seat core member of the present invention, by providing a plurality of ridges extending in the rising direction of the seat core member in the rising portion of the seat core member opposed to the calves of the body, when a passenger sits on the seat portion, or when the cushion layer deforms by exerting the cushioning effect, vertical sliding between the seat core member and the cushion layer in the rising portion of the seat portion is promoted, and the occurrence of rubbing sound caused by the sliding of the contact surface can be effectively reduced without impairing the cushioning property of the cushion layer. Therefore, the seat core member can be widely used as the seat core member used for automobile seats, and the like.

REFERENCE SIGNS LIST

1 Seat
2 Backrest portion
3 Seat portion
4 Seat core member
5 Cushion layer
6 Horizontal portion
7 Rising portion
8 Corner portion
9 Rising direction
10 Ridge
11 Recessed portion

The invention claimed is:

1. A seat core member comprising:
a plurality of ridges that extend in a rising direction of the seat core member in a rising portion of the seat core member being in contact with a cushion layer and the rising portion being positioned in a front direction of the seat core member, in the seat core member of a seat portion provided with the seat core member including a hard synthetic resin foam which is at least one of the group consisting of a polypropylene-based resin foam, a polyethylene-based resin foam, and a polystyrene-based resin foam and the cushion layer including a soft synthetic resin foam which is a polyurethane-based resin foam and covering the seat core member.

2. The seat core member according to claim 1, wherein the ridges are respectively formed in parallel, and a length of each of the ridges in the rising direction of the seat core member is at least ten times or more a width of the ridge.

3. The seat core member according to claim 1, wherein each of the ridges extends in the rising direction of the seat core member as a continuous ridge.

4. The seat core member according to claim 1, wherein the ridges have a height of 0.1 to 3 mm, a width of 0.1 to 1 mm, a groove width of 0.5 to 4 mm, and a ridge pitch of 1 to 5 mm.

5. The seat core member according to claim 4, wherein the ridges have a height of 0.2 to 2 mm, a width of 0.2 to 1 mm, a groove width of 0.5 to 2 mm, and a ridge pitch of 1 to 3 mm.

6. The seat core member according claim 1, wherein the hard synthetic resin foam that forms the seat core member is a polypropylene-based resin foam.

7. The seat core member according to claim 6, wherein the polypropylene-based resin foam has an apparent density of 0.01 to 0.5 g/cm$^3$.

8. The seat core member according to claim 1, wherein the polyurethane-based resin foam has an apparent density of 0.01 to 0.1 g/cm$^3$.

9. A seat comprising:
the seat core member according to claim 1; and
a backrest portion.

* * * * *